United States Patent [19]

Savino et al.

[11] Patent Number: 6,015,167
[45] Date of Patent: Jan. 18, 2000

[54] SYSTEM AND METHOD OF EMPLOYING A SINGLE BAR CODE FOR COORDINATING SHIPPING AND RECEIVING INFORMATION

[75] Inventors: John E. Savino; Thomas P. Gallagher, both of Manchester, Conn.; Barbara Reid Macy, Longmeadow, Mass.; Michael John Scully, Ellington; Elizabeth D. Toney, Stafford Springs, both of Conn.; Ernest R. Harlow, Westfield; James W. Naglieri, East Longmeadow, both of Mass.

[73] Assignee: United Technologies Corporation, Hartford, Conn.

[21] Appl. No.: 09/134,570

[22] Filed: Aug. 14, 1998

[51] Int. Cl.[7] .................................................. B42D 15/00
[52] U.S. Cl. ............................................. 283/67; 283/79
[58] Field of Search .................................. 283/67, 70, 79, 283/80, 81, 72, 117; 235/375, 383, 385; 53/135.1, 415

[56] References Cited

U.S. PATENT DOCUMENTS

| | | | |
|---|---|---|---|
| 4,995,642 | 2/1991 | Juszak et al. | 283/79 X |
| 5,421,778 | 6/1995 | Kouramanis | 283/79 X |
| 5,563,401 | 10/1996 | Lemelson | 283/67 X |
| 5,855,395 | 1/1999 | Foote et al. | 283/67 |
| 5,918,910 | 7/1999 | Stillwagon et al. | 283/67 |

*Primary Examiner*—Willmon Fridie, Jr.
*Attorney, Agent, or Firm*—McCormick, Paulding & Huber LLP

[57] ABSTRACT

A system of employing a single bar code provided on a shipping label for coordinating shipping and receiving information between supplier and customer includes accessing a supplier digital processor including a parts database from a customer digital processor via a digital communication link. Purchase order information is selected in the parts database. Authorization is provided from the customer digital processor to the supplier digital processor for the immediate shipment of the selected purchase order by means of an authorization command, and a single bar code is generated and provided on a shipping label in response to the authorization command, whereby the single bar code is linked to a plurality of predetermined relevant purchase and shipping information associated with the purchase order.

10 Claims, 4 Drawing Sheets

SYSTEM AND METHOD OF EMPLOYING A SINGLE BAR CODE FOR COORDINATING SHIPPING AND RECEIVING INFORMATION

FIELD OF THE INVENTION

The present invention relates generally to a system for coordinating shipping and receiving information, and more particularly to a system and method of employing a single bar code for coordinating shipping and receiving information.

BACKGROUND OF THE INVENTION

Coordinating shipping and receiving information between the customer and the supplier via conventional mail, electronic data interchange (EDI) transmission or the internet is often fraught with difficulties to both customer and supplier. A supplier typically receives purchase and shipping information from the customer by the above-mentioned methods and then re-enters the purchase information into the supplier's database. This additional step of re-entering the purchase information can lead to corruption of the original purchase and shipping information provided by the customer. Purchase request errors typically result in wrong parts being shipped, and in turn, unacceptable delays and additional expense to both customer and supplier in returning and replacing these bad shipments.

Another drawback in coordinating shipping and receiving information via conventional methods is the danger that ordered parts are shipped in response to an inquiry by the customer, but before the customer has given authorization for shipment. Such premature shipments or "ship aheads" lead to prematurely reduced inventories and often result in wasted time and expense to both customer and supplier in returning the unauthorized shipment.

A further drawback is that the packing slip supplied with each purchase order typically includes several bar codes that are scanned by the customer if equipped with an automated receiving system. Each bar code is associated with an aspect of the purchase order such as, for example, packing slip number, customer purchase order number, number of boxes, quantity of parts ordered, customer part number, manufacturer part number, shipping date, etc. If for example, nine bar codes are provided with each packing slip, it will typically take about one minute to scan-in each nine-block label. Based on an eight hour day with 480 minutes, only about 480 purchase orders can be scanned in with a single scanner which is both time consuming and costly. Further, several bar codes increases the likelihood that one or more of the bar codes provides incorrect information.

In response to the foregoing, it is an object of the present invention to provide a system and method of coordinating shipping and receiving information that overcomes one or more of the above-described drawbacks and disadvantages of shipping and receiving systems.

SUMMARY OF THE INVENTION

According to an aspect of the present invention, a method of employing a single bar code shipping label for coordinating shipping and receiving information between supplier and customer includes accessing a supplier digital processor including a parts database from a customer digital processor via a digital communication link. Parts order information is selected in the parts database. Authorization is provided from the customer digital processor to the supplier digital processor for the immediate shipment of the selected parts order information by means of an authorization command, and a single bar code is generated and provided on a shipping label in response to the authorization command, whereby the single bar code is linked to a plurality of purchase and shipping information associated with a purchase order.

According to another aspect of the present invention, a system is provided of employing a single bar code shipping label for coordinating shipping and receiving information between customer and supplier. A supplier digital processor is provided and includes a parts database. A customer digital processor is coupled to the supplier digital processor via a communications link for selecting and authorizing the immediate shipment of ordered parts by means of an authorization command. A bar code generator is coupled to the supplier digital processor for generating a shipping label including a single bar code in response to the authorization command, whereby the bar code is linked with purchase and shipping information associated with a purchase order.

According to yet another aspect of the present invention a system is provided of employing a single bar code shipping label for coordinating shipping and receiving information between customer and supplier. Included are means for accessing a supplier digital processor including a parts database from a customer digital processor via a digital communication link, means for selecting parts order information in the parts database, means for authorizing from the customer digital processor to the supplier digital processor the immediate shipment of the selected parts order information by means of an authorization command, and means for generating a single bar code shipping label from the supplier digital processor in response to the authorization command, whereby the single bar code is linked to the parts order information.

DETAILED DESCRIPTION OF THE PREFERRED EMBODIMENT

Figure 1:
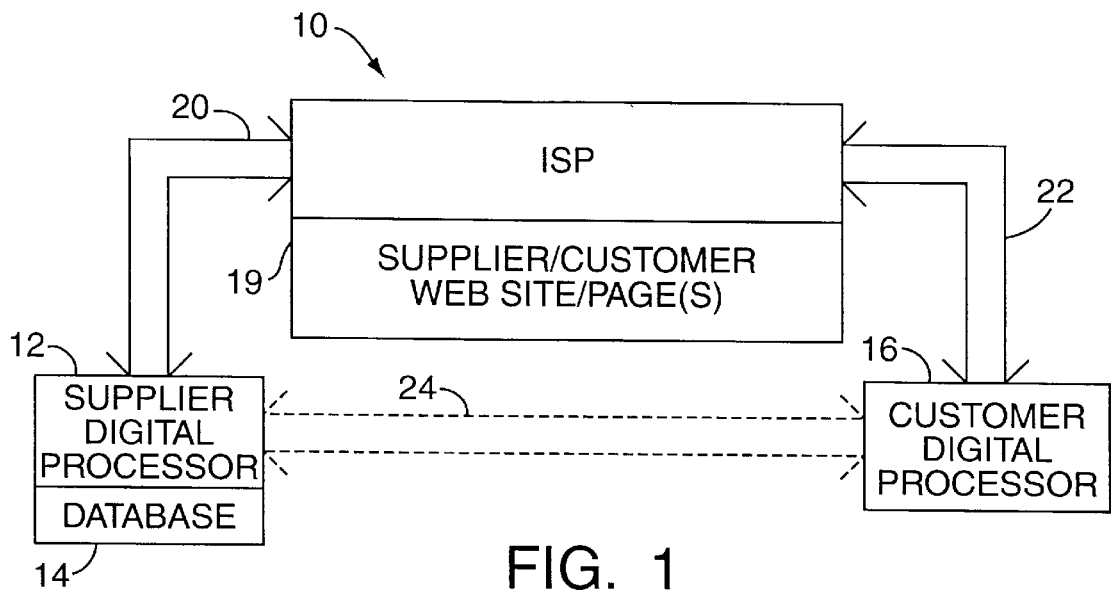
FIG. 1 schematically illustrates a system for coordinating shipping and receiving information via the internet and via EDI transmissions.

Turning now to FIG. 1, a system of employing a single bar code for coordinating shipping and receiving information between customer and supplier is indicated generally by the reference number 10. The system includes a supplier digital processor 12, such as a computer, controller or other device for manipulating digital information. The digital processor includes a database 14 for storing and retrieving parts that are sold by the supplier. The database 14 may be provided in the digital processor 12 or coupled to the digital processor from an external storage device.

The system further includes a customer digital processor 16, such as a computer or other device for manipulating digital information. The customer digital processor 16 is coupled to the supplier digital processor 12 via a communications link. As shown in FIG. 1., the customer and supplier digital processors 16 and 12 may be coupled to each other via an internet service provider (ISP) 18 which provides a supplier/customer web site or page 19 provided by an ISP server or the supplier. Specifically, the supplier digital processor is coupled to the ISP 18 via a communications link 20, such as a phone line, ISDN line, television cable transmission line or any suitable connection for transmitting analog or digital information via the internet between a remote digital processor and an ISP. Similarly, the customer digital processor 16 is coupled to the ISP 18 via a communication link 22 which may be any suitable connection for transmitting analog or digital information. Alternatively or in addition to internet transmission, as shown by the dashed line 24, the customer and supplier digital processors may communicate directly with each other via standard electronic data interchange (EDI) technology, such as, for example EDI technology employing X.12 856 transmission protocols. Other suitable wire or wireless transmission may also be implemented for communication between customer and supplier digital processors.

Figure 2:
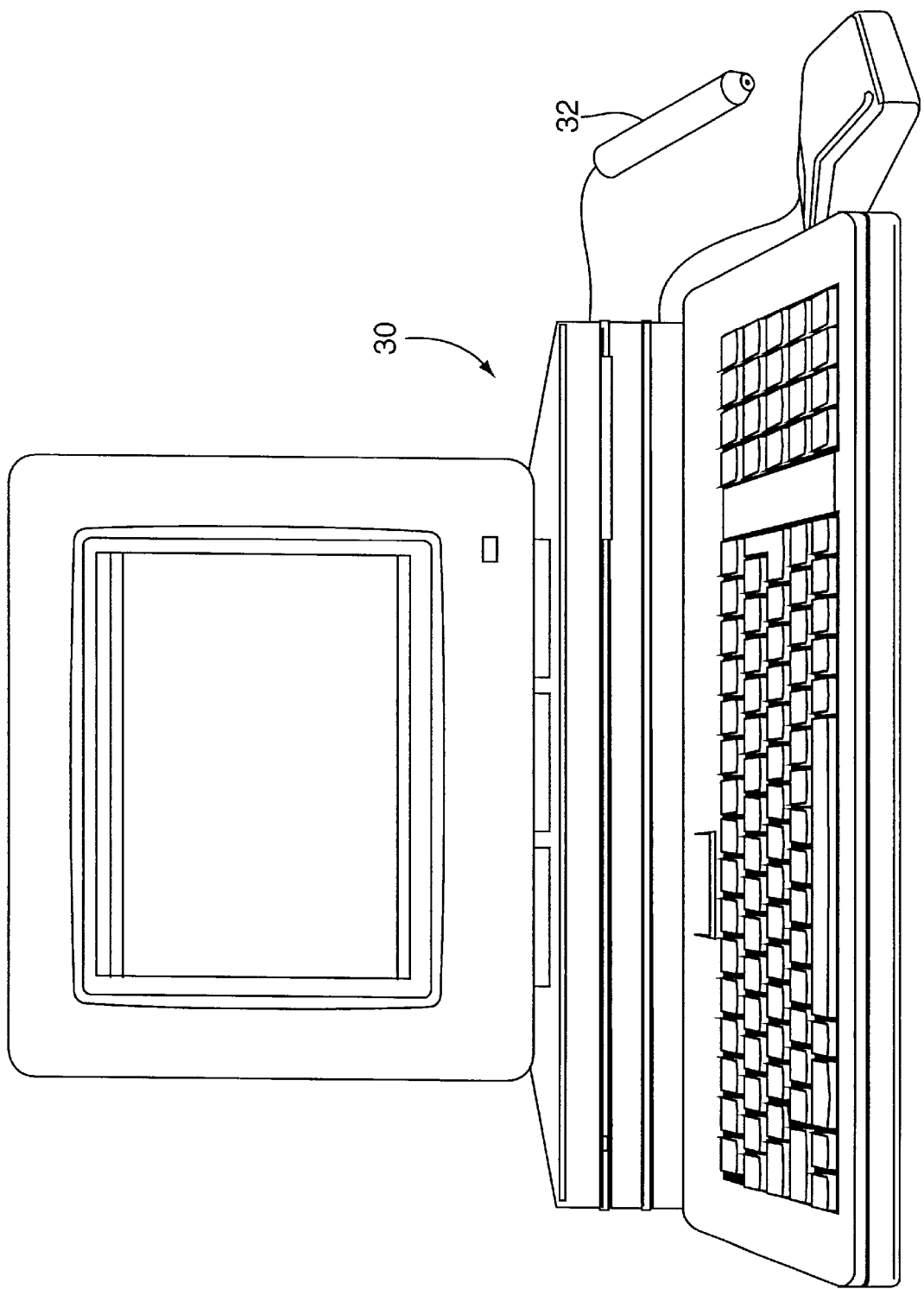
FIG. 2 schematically shows a digital processor or computer equipped with a bar code reader or scanner for scanning in purchase and shipping information from a single bar code provided with a parts shipment.
Figure 5:
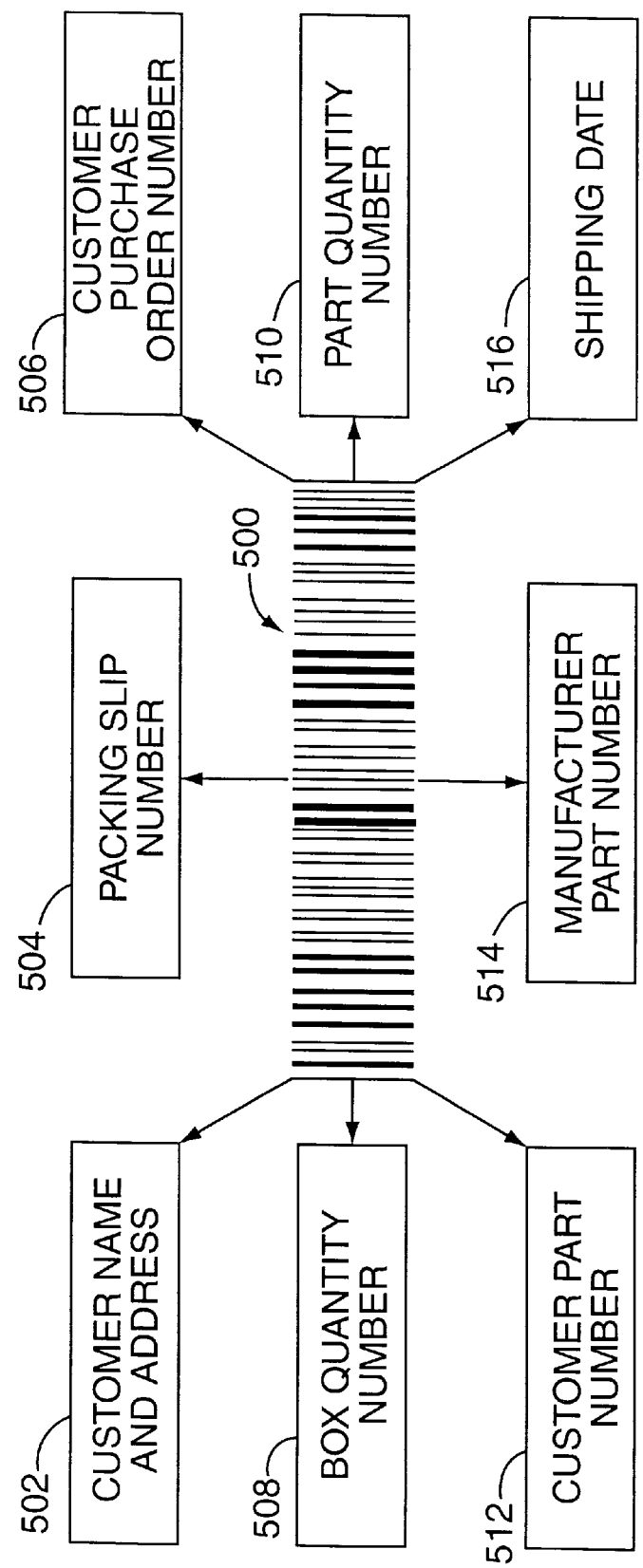
FIG. 5 schematically illustrates database links between a single bar code value and a plurality of predetermined relevant purchase and shipping information associated with a purchase order in accordance with the present invention.

Referring to FIG. 2, a supplier or customer digital processor 30 may employ conventional scanning technology for scanning the single bar code generated by the system 10. The digital processor 30 is coupled to a digital scanner 32, such as a bar code reader, wand or scanner, which retrieves from the database 14 a plurality of predetermined relevant purchase and shipping information associated with a purchase order upon a scan of the single bar code provided on a shipping label. For example, as illustrated in FIG. 5, a bar code value represented by the bar code 500 provided in accordance with the present invention is stored in the database 14 and is linked in the database by conventional software methods to various variables or aspects of purchase and shipping information of a purchase order such as customer name and address 502, packing slip number 504, customer purchase order number 506, box quantity number 508, part quantity number 510, customer part number 512, manufacturer part number 514, shipping date 516, etc. Thus, the supplier or customer if so equipped, need only scan a single bar code to retrieve from the database all relevant purchase and shipping information associated with a purchase order.

Figure 3:
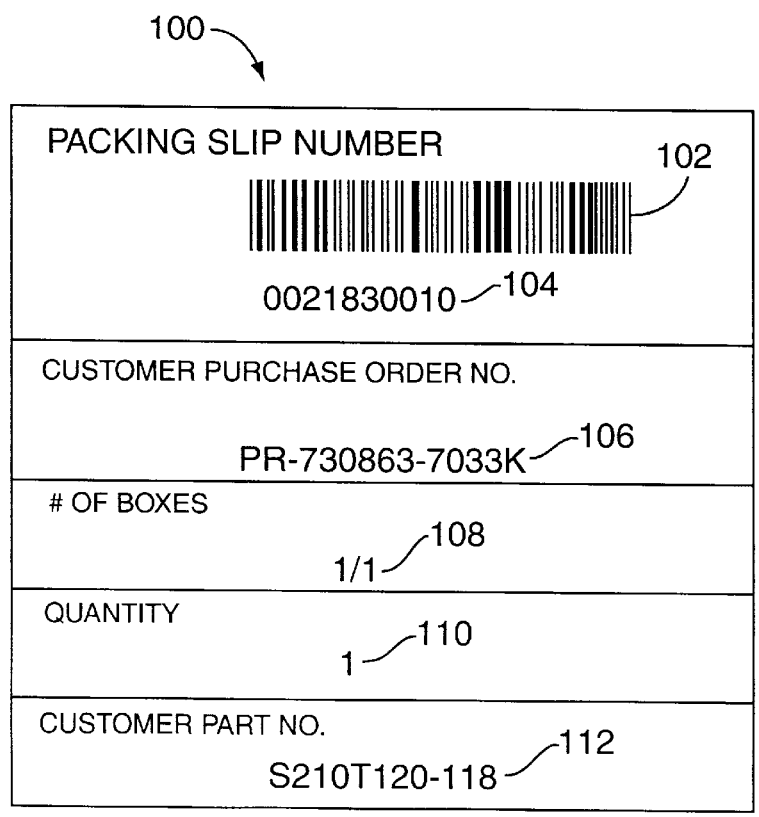
FIG. 3 illustrates a shipping label having a single-block bar code linked to all relevant purchase and shipping information in accordance with the present invention.

FIG. 3 illustrates a shipping label 100 generated by the system 10 in accordance with the present invention. The shipping label includes a single-block bar code 102 which when scanned accesses the scanning system to a plurality of predetermined relevant purchase and shipping information associated with a purchase order which is stored in the supplier database 14 or digital processor 12. A "trigger number" 104 provides an alternative means for accessing the purchase and shipping information provided by the bar code 102. The shipping label 100 may also list some of the purchase and shipping information such as, for example, a customer purchase order number 106, a box quantity number 108, a part quantity number 110 and a customer part number 112.

Figure 4:
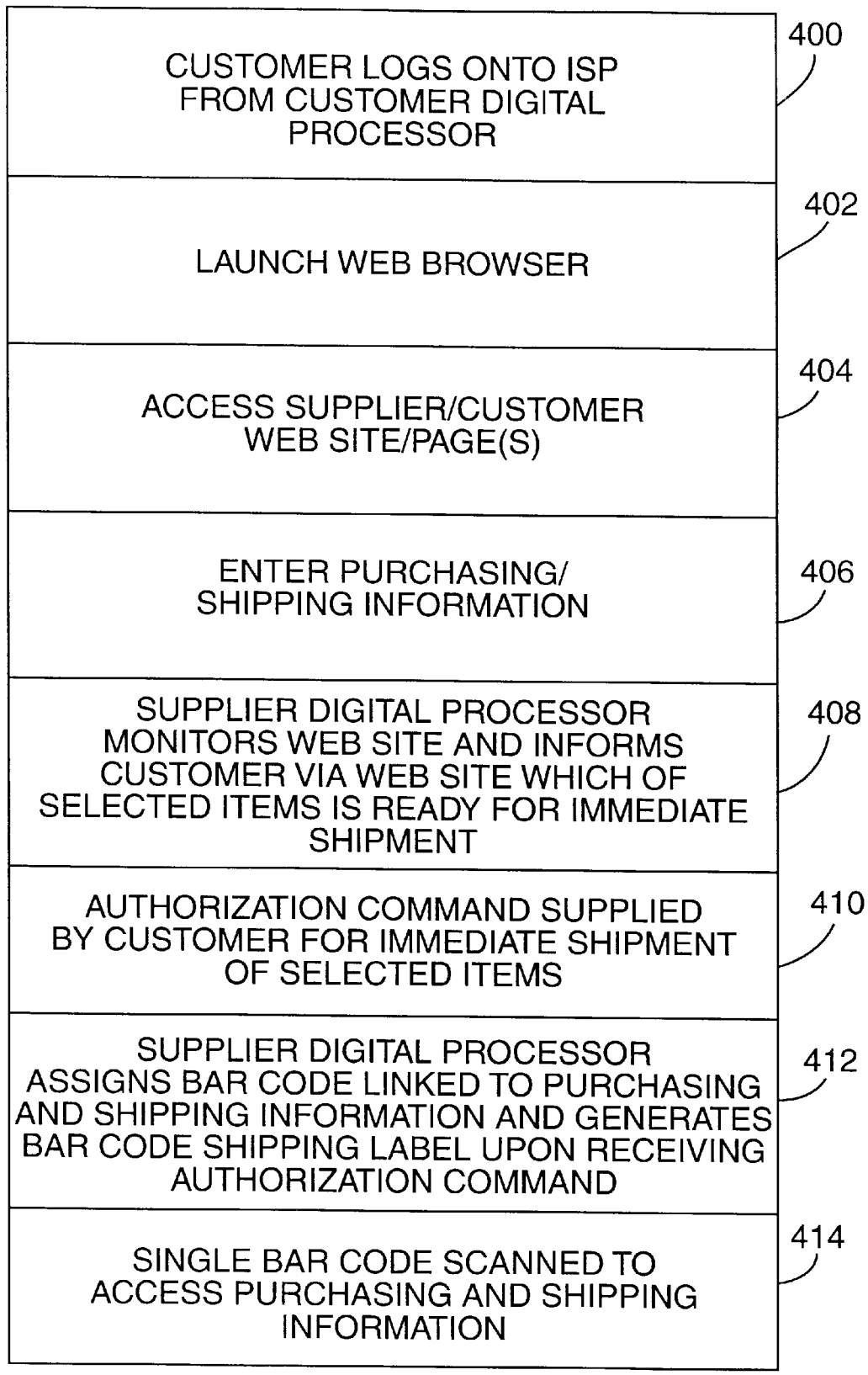
FIG. 4 is a flow chart illustrating a sequence for purchasing parts over the internet and scanning a purchase shipment at an automated receiving station.

An example of ordering and shipping parts via the internet is shown with reference to the flow chart of FIG. 4. Step 400 indicates that the customer logs onto an internet service provider (ISP) from the customer digital processor 16. The customer digital processor 16 then launches a web browser (step 402) stored in the customer digital processor 16 in order to communicate with the supplier digital processor 12 via the internet. The customer digital processor 16 next accesses the customer/supplier web site or page(s) 19 for viewing which items may be ordered from the supplier (step 404). The customer is prompted by the web site to initially select items provided on the web site 19 in which the customer is interested in purchasing by entering purchase and shipping information such as customer name and address, and part numbers and quantities of the initially selected items (step 406). The supplier digital processor 12 continually monitors the same web site or page(s) and transmits to the customer digital processor 16 via the web site 19 which of the initially selected items is ready for immediate shipment (step 408). The customer then transmits an authorization command via the web site 19 to inform the supplier digital processor 12 that there is authorization for immediate shipment of the selected part (step 410). The supplier digital processor 12, upon receiving the authorization command, assigns a bar code and generates a bar code shipping label (step 412). The bar code links in the database 14 or supplier digital processor 12 a plurality of predetermined relevant purchase and shipping information entered by the customer and associated with a purchase order. Because the bar code shipping label provides information directly entered by the customer, corruption of purchase order information through re-entry of the information by the supplier is avoided. The bar code may be scanned (step 414) by the supplier digital processor 12 or the customer digital processor 16 to access from the database 14 a plurality of predetermined relevant purchase and shipping information associated with the customer's purchase order including, for example, customer name and address, packing slip number, purchase order number, box quantity number, part quantity number, customer part number, manufacturer part numbers, shipping date, etc.

The system of the present invention may also be employed with EDI transmissions, such as, for example, an 856 EDI transmission. The sequence of steps is substantially the same as that illustrated in FIG. 4 for the internet except that communications are received and transmitted directly from the customer and supplier's digital processors by known EDI transmission protocols, such as 856 EDI transmissions, without the need of an intermediary web site.

One advantage of the system embodying the present invention is that purchase and shipping information is only entered by the customer in order to ensure reliability of order information. There is no re-entry of purchase order information into the database of the supplier which can lead to corruption of the originally supplied purchase order information. A second advantage is that scanning a single bar code to access a plurality of predetermined relevant purchase and shipping information associated with a purchase order is more efficient and time effective than conventional systems which employ a plurality of bar codes which must all be individually scanned for a single part or purchase order. For example, it takes about one minute to scan in a nine-block bar code label associated with a purchase order, while it takes about three seconds or less to scan in a single bar code associated with all purchase and shipping information in accordance with the present invention. Based on an eight hour day with 480 minutes, this amounts to about 480 scan-ins a day for the nine-block bar code versus about 9,600 scan-ins a day for the single bar code system embodying the present invention. The increase in receipts produced by the single bar code system of the present invention is about 20-fold which is about a 95% improvement in productivity based on duration of time for such scan-ins. In other words, the customer can easily incorporate the single bar code shipping system into an automated receiving process with laser-scanned receivers which, by means of a single scan of the single bar code, accesses all relevant purchase and shipping information from the supplier database 14 or the supplier digital processor 12 via the internet or conventional EDI transmission. A third advantage is that the bar code is generated on a shipping label only after the supplier receives an authorization command from the customer. Thus, both supplier and customer avoid the waste of time and money in returning and processing unwanted or premature shipments. A fourth advantage is that the system of the present invention eliminates the problem associated with prematurely reduced inventories at the supplier. A fifth advantage is that the bar code provided on the shipping label eliminates the need for a conventional and more complex packing slip which typically includes several bar codes each associated with an aspect of the purchase order. A sixth advantage is that a customer or supplier can easily access shipping and receiving status information pertaining to purchase orders and parts shipped.

Although this invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. A method of employing a single bar code shipping label for coordinating shipping and receiving information between supplier and customer, comprising the steps of:

accessing a supplier digital processor including a parts database from a customer digital processor via a digital communication link;

selecting and entering purchase and shipping information associated with a purchase order from items provided in the parts database;

authorizing from the customer digital processor to the supplier digital processor the immediate shipment to the customer of the purchase order by means of an authorization command; and generating a single bar code on a shipping label in response to the authorization command, whereby the single bar code is linked to a plurality of predetermined relevant purchase and shipping information associated with the purchase order.

2. A method as defined in claim 1, wherein the purchase and shipping information associated with a purchase order includes at least two of: customer name and address, customer packing slip number, purchase order number, box quantity number, part quantity number, customer part number, manufacturer part number, and shipping date.

3. A method as defined in claim 1, wherein the step of selecting includes the steps of:

initially selecting parts listed in the database; and transmitting from the supplier digital processor to the customer digital processor which of the initially selected parts can receive authorization for immediate shipment.

4. A method as defined in claim 1, wherein the customer digital processor and the supplier digital processor communicate with each other over the internet via a customer/supplier web site.

5. A method as defined in claim 1, wherein the customer digital processor and the supplier digital processor communicate with each other via electronic data interchange technology (EDI).

6. A method as defined in claim 1, wherein the customer digital processor and the supplier digital processor communicate via electronic data interchange technology (EDI) employing X.12 856 transmission protocol.

7. A system of employing a single bar code shipping label for coordinating shipping and receiving information between customer and supplier, comprising:

a supplier digital processor including a parts database;

a customer digital processor coupled to the supplier digital processor via a communications link for selecting items provided in the parts database, entering purchase and shipping information associated with a purchase order, and authorizing the immediate shipment of the purchase order by means of an authorization command; and a bar code generator coupled to the supplier digital processor for generating a shipping label including a single bar code in response to the authorization command, whereby the bar code is linked to a plurality of predetermined relevant purchase and shipping information associated with the purchase order.

8. A system as defined in claim 7, wherein the parts order information includes at least two of: customer name and address, customer packing slip number, purchase order number, box quantity number, part quantity number, customer part number, manufacturer part number, and shipping date.

9. A system of employing a single bar code shipping label for coordinating shipping and receiving information between customer and supplier, comprising:

means for accessing a supplier digital processor including a parts database from a customer digital processor via a digital communication link;

means for selecting and entering purchase and shipping information associated with a purchase order from items provided in the parts database;

means for authorizing the immediate shipment of the purchase order by means of an authorization command; and means for generating a single bar code on a shipping label in response to the authorization command, whereby the single bar code is linked to a plurality of predetermined relevant purchase and shipping information associated with the purchase order.

10. A system as defined in claim 9, further including means for scanning the bar code shipping label to retrieve the plurality of predetermined relevant purchase and shipping information.

* * * * *